(12) United States Patent
Liu et al.

(10) Patent No.: US 12,457,543 B2
(45) Date of Patent: Oct. 28, 2025

(54) ACCESS CONTROL METHOD, FIRST NETWORK NODE, SECOND NETWORK NODE, AND STORAGE MEDIUM

(71) Applicant: ZTE CORPORATION, Shenzhen (CN)

(72) Inventors: Xu Liu, Shenzhen (CN); Bo Dai, Shenzhen (CN); Xiubin Sha, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 403 days.

(21) Appl. No.: 18/014,325

(22) PCT Filed: Jun. 11, 2021

(86) PCT No.: PCT/CN2021/099719
§ 371 (c)(1),
(2) Date: Jan. 3, 2023

(87) PCT Pub. No.: WO2022/001632
PCT Pub. Date: Jan. 6, 2022

(65) Prior Publication Data
US 2023/0247526 A1    Aug. 3, 2023

(30) Foreign Application Priority Data
Jul. 3, 2020    (CN) .......................... 202010635122.3

(51) Int. Cl.
*H04W 48/02* (2009.01)
*H04W 8/22* (2009.01)
*H04W 48/08* (2009.01)

(52) U.S. Cl.
CPC ............. *H04W 48/02* (2013.01); *H04W 8/22* (2013.01); *H04W 48/08* (2013.01)

(58) Field of Classification Search
CPC ........ H04W 48/02; H04W 48/08; H04W 8/22
See application file for complete search history.

(56) References Cited

U.S. PATENT DOCUMENTS

| 2011/0235558 A1 | 9/2011 | Diachina et al. |
| 2011/0235581 A1 | 9/2011 | Diachina et al. |

(Continued)

FOREIGN PATENT DOCUMENTS

| CN | 111345072 A | 6/2020 |
| CN | 111918359 A | 11/2020 |

(Continued)

OTHER PUBLICATIONS

First Search Report in Chinese Application No. 2020106351223, dated Oct. 28, 2024, 9 pages.

(Continued)

*Primary Examiner* — Margaret G Webb
(74) *Attorney, Agent, or Firm* — Morgan, Lewis & Bockius LLP

(57) ABSTRACT

Provided are an access control method, a first network node, a second network node, and a storage medium. The method includes: acquiring a target access control parameter according to a terminal type to which the first network node belongs; and determining access control information according to the target access control parameter, where the access control information includes access allowed or access forbidden.

17 Claims, 2 Drawing Sheets

Configure a target access control parameter corresponding to a terminal type according to the terminal type, where the target access control parameter is configured for indicating access control information, where the access control information includes access allowed or access forbidden — 210

Transmit the access control parameter — 220

(56) References Cited

U.S. PATENT DOCUMENTS

| | | | |
|---|---|---|---|
| 2019/0327663 A1 | 10/2019 | Wirth et al. | |
| 2020/0204325 A1* | 6/2020 | Liu | H04L 5/001 |
| 2020/0344630 A1* | 10/2020 | Jha | H04W 76/19 |
| 2022/0272753 A1* | 8/2022 | Hakola | H04B 7/0617 |
| 2022/0361122 A1* | 11/2022 | Zheng | H04L 5/0091 |
| 2023/0036057 A1* | 2/2023 | Lei | H04W 8/22 |
| 2023/0156583 A1* | 5/2023 | Murray | H04W 48/20 370/329 |

FOREIGN PATENT DOCUMENTS

| | | |
|---|---|---|
| CN | 112020879 A | 12/2020 |
| CN | 112385270 A | 2/2021 |
| WO | WO-2018127505 A1 | 7/2018 |

OTHER PUBLICATIONS

First Office Action in Chinese Application No. 202010635122.3, dated Oct. 31, 2024, 15 pages.

Supplementary European Search Report in Application No. EP21832970, dated Jul. 1, 2024, 4 pages.

Qualcomm Incorporated: "Considerations for Standardization Framework and Design Principles of RedCap Devices", 3GPP TSG-RAN WG1 Meeting #101, R1-2004496, e-Meeting, May 25-Jun. 5, 2020.

Huawei et al.: "Other aspects for reduced capability devices", 3GPP TSG RAN WG1 Meeting #101-e, R1-2004612, E-meeting, May 25-Jun. 5, 2020.

Vivo et al.: "Framework and Principles for Reduced Capability NR devices", 3GPP TSG RAN WG1 #102-e, R1-2005386, e-Meeting, Aug. 17-28, 2020.

Ericsson, "Higher-layer aspects for Redcap", 3GPP TSG-RAN WG1 Meeting #101-e, R1-2003292, May 25-Jun. 5, 2020, 8 pages.

Samsung, "Considerations on access barring and UE capability", 3GPP TSG-RAN WG1 #101, R1-2003913, May 25-Jun. 5, 2020, 2 pages.

ZTE Corporation, Sanechips, "Redcap UE identification and access control", 3GPP TSG-RAN WG2 #111 electronic, R2-2006904, Aug. 7, 2020, 4 pages.

International Search Report in Application No. PCT/CN2021/099719 dated Aug. 27, 2021, 6 pages, including translation.

\* cited by examiner

ACCESS CONTROL METHOD, FIRST NETWORK NODE, SECOND NETWORK NODE, AND STORAGE MEDIUM

CROSS REFERENCE TO RELATED APPLICATIONS

This is a National Stage Application filed under 35 U.S.C. 371, based on International Patent Application No. PCT/CN2021/099719, filed on Jun. 11, 2021, which claims priority to Chinese Patent Application No. 202010635122.3 filed with the China National Intellectual Property Administration (CNIPA) on Jul. 3, 2020, the disclosures of which are incorporated herein by reference in their entireties.

TECHNICAL FIELD

The present application relates to radio communication networks, for example, an access control method, a first network node, a second network node, and a medium.

BACKGROUND

In a New Radio (NR) system, compared with other terminals, a reduced capability (REDCAP) terminal has a relatively low service priority and requires more bandwidth resources for obtaining the same data rate. If the preceding characteristics of the REDCAP terminal are ignored, and unified access control parameters are used for access control of the REDCAP terminal and other terminals. For example, the REDCAP terminal and other terminals with the same access control parameters are allowed to access the NR system, and the REDCAP terminal occupies more bandwidth resources, then the communication efficiency and the performance of the entire system cannot be guaranteed. Due to inflexible access control and low reliability, the access of the REDCAP terminal affects the communication quality of deployed terminals.

SUMMARY

The present application provides an access control method, a first network node, a second network node, and a storage medium, so as to improve the flexibility and reliability of access control.

An embodiment of the present application provides an access control method. The access control method is applied to a first network node and includes the following.

A target access control parameter is acquired according to a terminal type to which the first network node belongs.

Access control information is determined according to the target access control parameter, where the access control information includes access allowed or access forbidden.

An embodiment of the present application provides an access control method. The access control method is applied to a second network node and includes the following.

A target access control parameter corresponding to a terminal type is configured according to the terminal type, where the target access control parameter is configured for indicating access control information, where the access control information includes access allowed or access forbidden.

The access control parameter is transmitted.

An embodiment of the present application further provides a first network node. The first network node includes one or more processors and a storage apparatus, which is configured to store one or more programs.

When executed by the one or more processors, the one or more programs cause the one or more processors to perform the access control method applied to the first network node.

An embodiment of the present application further provides a second network node. The second network node includes one or more processors and a storage apparatus, which is configured to store one or more programs.

When executed by the one or more processors, the one or more programs cause the one or more processors to perform the access control method applied to the second network node.

An embodiment of the present application further provides a computer-readable storage medium, which is configured to store computer programs which, when executed by a processor, perform the access control method applied to the first network node or the access control method applied to the second network node.

DETAILED DESCRIPTION

Figure 1:
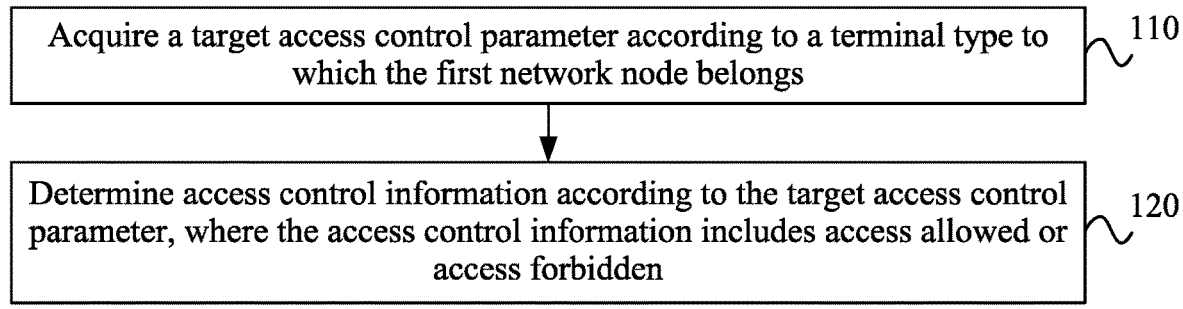
FIG. 1 is a flowchart of an access control method according to an embodiment.

The present application is described hereinafter in conjunction with drawings and embodiments. It is to be understood that the embodiments described herein are intended to illustrate the present application and not to limit the present application. It is to be noted that if not in collision, embodiments of the present application and features therein may be combined with each other in any manner. Additionally, it is to be noted that for ease of description, only part, not all, of structures related to the present application are illustrated in the drawings.

In an NR system, unified access control (UAC) may be performed on a terminal according to an access category or an access identity of the terminal. A total of 64 access categories are defined, where Categories 0 to 8 may be applied to NR access control, and a total of 16 access identities are defined, where Categories 0 to 3 and Categories 11 to 15 may be applied to the NR access control.

Compared with other terminals in the NR system, a REDCAP terminal has a relatively low service priority and requires more bandwidth resources for obtaining the same data rate. If a unified manner is adopted for access control of the REDCAP terminal and other terminals in the NR system, the REDCAP terminal occupies more bandwidth resources so that the communication efficiency and the performance of the entire system cannot be guaranteed, and the access of the REDCAP terminal affects the communication quality of deployed terminals.

In the embodiments of the present application, an access control method is provided and may be applied to a first network node, where the first network node is, for example, a user terminal (UE), including a REDCAP terminal. The first network node determines a target access control parameter according to a terminal type to which the first network node belongs and whether access is allowed is determined according to the target access control parameter, so as to achieve access control for different types of terminals, respectively, thereby improving the flexibility and reliability of the access control.

FIG. 1 is a flowchart of an access control method according to an embodiment. As shown in FIG. 1, the method provided in this embodiment includes 110 and 120.

In 110, a target access control parameter is acquired according to a terminal type to which the first network node belongs.

In this embodiment, the terminals may be divided into a REDCAP terminal and a non-reduced-capability (non-RED-CAP) terminal, and the terminals may also be divided into a terminal whose UAC is performed through an NR access control parameter, a terminal whose access control is performed through an access control parameter configured for the REDCAP terminal separately, and the like. According to the terminal type to which the first network node belongs, the first network node acquires the corresponding target access control parameter as a basis for access control, where the target access control parameter is configured for indicating access control corresponding to the terminal type to which the first network node belongs, that is, indicating whether access of the first network node of this terminal type is allowed. The target access control parameter corresponding to each terminal type may be configured by a second network node (for example, a base station) and transmitted to the first network node.

In 120, access control information is determined according to the target access control parameter, where the access control information includes access allowed or access forbidden.

In this embodiment, the first network node completes access control check according to the acquired target access control parameter, that is, determines whether the access of the first network node is allowed or forbidden. If the access is allowed, the first network node initiates random access in a target cell where the first network node is currently located.

In an embodiment, the access control of the first network node is enabled in the following manner: the second network node configures indication information indicating whether access of each cell is allowed in a master information block (MIB). For example, in the case where the target cell where the first network node is indicated to be located is in a barred state, the first network node considers that access to the target cell is forbidden, a parameter related to access control does not need to be read continuously, and the access control check does not need to be performed; and in the case where the access of the target cell is indicated to be allowed, the first network node may continuously read related configuration information in system information block 1 (SIB1) and complete the access control check and the like according to the target access control parameter. On this basis, if the access control information corresponding to the target access control parameter is access allowed, the first network node may initiate random access in the target cell.

In an embodiment, the first network node is the REDCAP terminal. For the REDCAP terminal, the access control of the REDCAP terminal is enabled in the following two manners: in the first manner, the indication information configured by the second network node in the MIB is also applicable to the REDCAP terminal, the REDCAP terminal needs to read the indication information first, and then according to whether the state of the target cell is indicated to be the barred state, whether to further read related configuration and the target access control parameter and determine whether access is allowed is determined; in the second manner, additional indication information of whether the access is allowed is added to the REDCAP terminal, and the indication information only works in the case where it is indicated that the target cell of the NR allows the access, that is, if the target cell of the NR is indicated to be in the barred state, the REDCAP terminal also considers that the target cell is in the barred state; and if the target cell of the NR is indicated to allow the access, then according to whether the added indication information is the barred state, whether to further read the related configuration and the target access control parameter and determine whether the access is allowed is further determined.

In an embodiment, the REDCAP terminal is associated with related configuration of the target access control parameter of an access control category and may be configured in an independent SIB message. For example, a newly introduced SIB message is SIB1-REDCAP. In this case, the REDCAP terminal needs to read the SIB1-REDCAP for performing the access control check. If the access is allowed, other SIB messages need to be read continuously.

In an embodiment, the method further includes the following.

In 101, the terminal type to which the first network node belongs is determined according to at least one of terminal type information or terminal capability information.

In this embodiment, the terminal type of the terminal may be determined according to a bandwidth capability of the first network node, for example, terminals supporting different bandwidths correspond to different types of REDCAP terminals; or the terminal type of the terminal may also be determined according to a type of a REDCAP terminal reported by the first network node.

In an embodiment, the number of target access control parameters corresponding to a first REDCAP terminal may be the same as or different from the number of target access control parameters corresponding to a second REDCAP terminal.

In an embodiment, the terminal type includes a REDCAP terminal type and a non-reduced-capability (non-REDCAP) terminal type.

In this embodiment, the REDCAP terminal and the non-REDCAP terminal are distinguished, so as to perform access control respectively. The target access control parameter and access control information corresponding to the REDCAP terminal may be the same as or different from the target access control parameter and access control information corresponding to the non-REDCAP terminal.

In an embodiment, the access control category associated with the target access control parameter includes a reserved category in an NR access control category.

In this embodiment, the access control category associated with the target access control parameter includes a reserved category in an NR Access Category. In the case where the first network node is the REDCAP terminal, the reserved category in the NR Access Category may be applied to the categorization of REDCAP terminals, that is, according to the reserved category in the NR Access Category, the same parameter configuration and definition are applied to access control parameter configuration for the REDCAP terminals. For example, the reserved category in the NR Access Category includes Categories 9 to 31, and Categories 9 to 17 are used for access control parameter configuration for the REDCAP terminals.

In an embodiment, the access control category associated with the target access control parameter includes an occupied category in the NR access control category.

In this embodiment, the access control category associated with the target access control parameter includes an occupied category in an NR Access Category. In the case where the first network node is the REDCAP terminal, the occupied category in the NR Access Category may be used for the categorization of the REDCAP terminals, and indication information may also be added to each occupied category so as to indicate that access of the REDCAP terminal is allowed.

In an embodiment, the method further includes 102: acquiring n-bit indication information corresponding to the occupied category, where the indication information is configured for indicating access control information corresponding to the occupied category associated with the target access control parameter, where n is 1 or 2 or 3 or 4.

In this embodiment, in the case where the first network node is the REDCAP terminal, Categories 0 to 8 of the NR are used for configuring the target access control parameter of the REDCAP terminal, and n-bit indication information is added to Categories 0 to 8 respectively and configured for indicating that the access control information corresponding to each terminal type is access allowed or access forbidden or indicating whether each terminal type has the barred state consistent with the Category of the NR. The n-bit indication information is only applicable to the REDCAP terminal, but does not work for other terminals in the NR.

In this embodiment, the n-bit indication information corresponding to the occupied category is configured for indicating access control information corresponding to the occupied category associated with the target access control parameter, where n is 1 or 2 or 3 or 4.

For example, existing categories are divided into one category, and 1-bit indication information indicates that access control information corresponding to this category is access allowed or access forbidden, or 1-bit indication information indicates that access control information corresponding to this category is the same as or different from access control information of this category in the NR. For example, if n=1 and a value of 1-bit indication information corresponding to the occupied category to which the REDCAP terminal belongs obtained by the REDCAP terminal is true, it indicates that the barred state corresponding to the occupied category is the same as the barred state of the occupied category in the NR; if the value of the 1-bit indication information is not true, the barred state corresponding to the occupied category is different from the barred state of the occupied category in the NR.

For example, existing categories are divided into two categories, and 2-bit indication information indicates that access control information corresponding to the two categories is access allowed or access forbidden, or 2-bit indication information indicates that access control information corresponding to the two categories is the same as or different from access control information of the two categories in the NR.

For example, existing categories are divided into three categories, and 3-bit indication information indicates that access control information corresponding to the three categories is access allowed or access forbidden, or 3-bit indication information indicates that access control information corresponding to the three categories is the same as or different from access control information of the three categories in the NR.

For example, existing categories are divided into four categories, and 4-bit indication information indicates that access control information corresponding to the four categories is access allowed or access forbidden, or 4-bit indication information indicates that access control information corresponding to the four categories is the same as or different from access control information of the four categories in the NR.

In an embodiment, the access control category associated with the target access control parameter includes a predefined REDCAP terminal-specific access control category.

In this embodiment, in the case where the first network node is the REDCAP terminal, a specific access control category is defined for the REDCAP terminal.

In an embodiment, the specific access control category is defined as one of the following.

1) A number of specific access control categories is 64, and the specific access control categories include an access control category of a REDCAP terminal, a reserved category for access control of the REDCAP terminal, and an operator-defined category for the access control of the REDCAP terminal. For example, Categories 0 to 8 are REDCAP terminal types, Categories 9 to 31 are reserved categories of the REDCAP terminal, and Categories 32 to 63 are operator-defined categories for the REDCAP terminal.

2) The number of the specific access control categories is 32, and the specific access control categories include the access control category of the REDCAP terminal and the reserved category for the access control of the REDCAP terminal. For example, Categories 0 to 8 are the REDCAP terminal types, and Categories 9 to 31 are the reserved categories of the REDCAP terminal.

3) The number of the specific access control categories is 16, and the specific access control categories include the access control category of the REDCAP terminal and the reserved category for the access control of the REDCAP terminal. For example, Categories 0 to 8 are the REDCAP terminal types, and Categories 9 to 15 are the reserved categories of the REDCAP terminal.

4) The number of the specific access control categories is 9, and the specific access control categories include the access control category of the REDCAP terminal. For example, Categories 0 to 8 are the REDCAP terminal types.

In an embodiment, the terminal type includes at least a first REDCAP terminal type and a second REDCAP terminal type, where an access control parameter corresponding to the first REDCAP terminal type is the same as an access control parameter adopted by an NR terminal, and the second REDCAP terminal type corresponds to the target access control parameter.

In this embodiment, the first network node includes at least two types: a first REDCAP terminal and a second REDCAP terminal, where the first REDCAP terminal follows the NR Access Category and performs the access control check according to the access control parameter and related configuration of the NR; the second REDCAP terminal adopts the target access control parameter, the target access control parameter is associated with a newly introduced access control category, and the second REDCAP terminal performs the access control check according to the newly introduced access control category, where the newly introduced access control category may be the reserved category, the occupied category or the specific access control category in the NR access control category. In this case, the second network node needs to configure the target access control parameter and the like for each newly introduced access control category of the REDCAP terminal.

In an embodiment, the terminal type includes at least a first REDCAP terminal type and a second REDCAP terminal type, where an access control category associated with a target access control parameter corresponding to the first REDCAP terminal type and an access control category associated with a target access control parameter corresponding to the second REDCAP terminal type satisfy one of the following.

The access control category associated with the target access control parameter corresponding to the first REDCAP terminal type and the access control category associated with the target access control parameter corresponding to the second REDCAP terminal type are both reserved categories in an NR access control category.

The access control category associated with the target access control parameter corresponding to the first REDCAP terminal type and the access control category associated with the target access control parameter corresponding to the second REDCAP terminal type are both occupied categories in the NR access control category.

The access control category associated with the target access control parameter corresponding to the first REDCAP terminal type and the access control category associated with the target access control parameter corresponding to the second REDCAP terminal type are both predefined RED-CAP terminal-specific access control categories.

In this embodiment, the first network node includes at least two types: the first REDCAP terminal and the second REDCAP terminal. Both the first REDCAP terminal and the second REDCAP terminal adopt target access control parameters, the target access control parameters are associated with newly introduced access control categories (both are the reserved categories in the NR access control category, both are the occupied categories, or both are the specific access control categories), and the access control check is performed according to the newly introduced access control categories. In this case, the second network node needs to configure the corresponding target access control parameter of each access control category for the first REDCAP terminal and the second REDCAP terminal, respectively. The target access control parameter corresponding to the first REDCAP terminal may be configured to be the same as or different from the target access control parameter corresponding to the second REDCAP terminal.

In this embodiment, the newly introduced access control categories include the following.
1) The reserved categories, Categories 9 to 17, of the NR access control category are included. The same access control parameter configuration and definition are applied to the access control of the first REDCAP terminal and the second REDCAP terminal.
2) The occupied categories, Categories 0 to 8, of the NR access control category are included. The occupied categories in the NR Access Category may be used for the categorization of the REDCAP terminals, and n-bit indication information may also be added to each occupied category so as to indicate whether access of the first REDCAP terminal and the second REDCAP terminal is allowed.
3) The predefined REDCAP terminal-specific access control category is included and may be applied to the access control of the first REDCAP terminal and the second REDCAP terminal.

In an embodiment, the first network node includes at least two types: the first REDCAP terminal and the second REDCAP terminal, where the first REDCAP terminal and the second REDCAP terminal respectively adopt target access control parameters, the target access control parameters are associated with the newly introduced access control categories, and the newly introduced access control categories associated with the target access control parameters adopted by the first REDCAP terminal and the second REDCAP terminal may be different. The second network node needs to configure the target access control parameters for the first REDCAP terminal and the second REDCAP terminal, respectively, and the first REDCAP terminal and the second REDCAP terminal acquire the target access control parameters according to respective terminal types and perform the access control check.

In this embodiment, the newly introduced access control categories include the following.
1) The reserved categories of the NR access control category are included. The access control parameter configuration and definition the same as those of Categories 9 to 17 are applied to the access control of the first REDCAP terminal and the second REDCAP terminal.
2) The occupied categories of the NR access control category are included. Categories 0 to 4 may be applied to the categorization of the first REDCAP terminal, Categories 5 to 8 may be applied to the categorization of the second REDCAP terminal, and n-bit indication information may also be added to each occupied category respectively so as to indicate whether the access of the first REDCAP terminal and the second REDCAP terminal is allowed.
3) The predefined REDCAP terminal-specific access control category is included and may be applied to the access control of the first REDCAP terminal or the second REDCAP terminal.

In an embodiment, 120 further includes the following.

In the case where the target access control parameter is not acquired, the access control information is determined according to an NR access control parameter.

In this embodiment, in the case where the first network node does not acquire the target access control parameter (for example, the second network node does not configure the corresponding target access control parameter for a terminal type to which the second network node belongs), access control information may be determined according to an existing NR access control parameter, and the access control is performed according to the access control information, so as to ensure the normal operation of the service of the first network node.

In an embodiment, the method further includes the following.

In 130, a candidate neighbor cell or a neighbor cell to be measured is determined according to a neighbor cell list dedicated to a REDCAP terminal or according to support capability information of each neighbor cell for the RED-CAP terminal in neighbor cell list information.

In 140, a target cell is reselected in the candidate neighbor cell or the neighbor cell to be measured.

In this embodiment, the first network node may determine the candidate neighbor cell or the neighbor cell to be measured that supports the REDCAP terminal and perform cell reselection in the candidate neighbor cell or the neighbor cell to be measured, that is, a neighbor cell with better communication quality is reselected as a new target cell, so as to switch to the reselected neighbor cell to initiate random access.

The second network node may configure a dedicated neighbor cell list for the REDCAP terminal. In the case where the first network node is the REDCAP terminal, the candidate neighbor cell or the neighbor cell to be measured may be determined according to the neighbor cell list. Alternatively, the REDCAP terminal may also determine the candidate neighbor cell or the neighbor cell to be measured according to the support capability information of each neighbor cell for the REDCAP terminal in the neighbor cell list information, and in this case, the second network node may broadcast indication information indicating whether each neighbor cell supports the REDCAP terminal in the neighbor cell list information.

In an embodiment, the support capability information of each neighbor cell for the REDCAP terminal is determined according to first indication information in intra-frequency neighbor cell information of a third system information block (SIB3) or according to second indication information in inter-frequency neighbor cell information of a fourth system information block (SIB4) or according to intra-frequency neighbor cell information or inter-frequency neighbor cell information in a system information block (SIB) dedicated to the REDCAP terminal.

In this embodiment, the neighbor cell list information includes the support capability information of each neighbor cell for the REDCAP terminal. Second network nodes (for example, base stations) exchange the support capability information of each cell for the REDCAP terminal and record the support capability information of each neighbor cell in the neighbor cell list for the REDCAP terminal. The second network node adds the configuration of the support capability information of each neighbor cell for the REDCAP terminal to the neighbor cell list information, that is, the second network node broadcasts the indication information indicating whether each neighbor cell supports the REDCAP terminal in the neighbor cell list information. For example, first indication information is added to the intra-frequency neighbor cell information (IntraFreqNeighCellInfo) in the SIB3, where the first indication information is SupportREDACAP ENUMERATED {true, false}; or the second indication information is added to the inter-frequency neighbor cell information (InterFreqNeighCellInfo) in the SIB4, where the second indication information is SupportREDACAP ENUMERATED {true, false}.

In an embodiment, the indication information of the support capability information of each neighbor cell for the REDCAP terminal may be configured in the SIB1 by the second network node or may be configured in downlink control information (DCI) for scheduling the SIB 1.

In this embodiment, through an SIB1 message or the DCI for scheduling the SIB1, the second network node may indicate whether each neighbor cell supports the REDCAP terminal. For example, whether each neighbor cell supports the REDCAP terminal is indicated through SupportREDACAP ENUMERATED {true, false}. If one neighbor cell supports the REDCAP terminal and is reselected as a new target cell by the first network node, in the case where the first network node is the REDCAP terminal, the first network node may further read the target access control parameter of the new target cell, determine the access control information, and in the case where the access control information is access allowed, initiate random access in the new target cell.

In an embodiment, the method further includes the following.

In 150, a paging message configuration message corresponding to the terminal type to which the first network node belongs is received according to the terminal type to which the first network node belongs.

The paging message configuration message includes part of paging related parameters shared with an NR terminal and part of paging related parameters dedicated to a REDCAP terminal.

In this embodiment, the second network node receives a paging message sent by a core network. If the paging message includes support capability information for the REDCAP terminal and the support capability information indicates that the second network node supports the access of the REDCAP terminal, the second network node may page the REDCAP terminal in a configured paging area. In the case where the first network node is the REDCAP terminal, the first network node may receive a paging message configuration message according to the terminal type to which the first network node belongs, where the paging message configuration message includes part of paging related parameters shared with an NR terminal and part of paging related parameters dedicated to a REDCAP terminal. The second network node configures a dedicated paging area or a shared paging area for the REDCAP terminal, and the paging message sent by the core network to the second network node includes the support capability information for the REDCAP terminal, that is, a REDCAP Capability cell is added to the message.

In an embodiment, part of the paging related parameters shared with the NR terminal includes at least one of the following: a default paging cycle or a number of paging occasions in a paging radio frame.

In an embodiment, the dedicated part of the paging related parameters includes at least one of the following: a band width part (BWP) or a physical downlink control channel (PDCCH) paging search space.

In this embodiment, part of the paging related parameters shared with the NR terminal may include the default paging cycle and the number (ns) of paging occasions in one paging radio frame and may also include the timing of monitoring the PDCCH at each paging occasion location, and the like. The dedicated part of the paging related parameters may include the BWP, the PDCCH paging search space, and the like.

In an embodiment, for the above-mentioned part of the paging related parameters shared with the NR terminal and the dedicated part of the paging related parameters, the configuration methods consistent with those in the NR system may be adopted; or the dedicated part of the paging related parameters (the BWP and the PDCCH paging search space) may be configured independently; or part of the paging related parameters shared with the NR terminal, the BWP, and the PDCCH paging search space are all configured independently.

In the access control method of this embodiment, the target access control parameters are configured for different terminal types, and the target access control parameters are associated with different access control categories, correspond to different access control information, and are used as the basis for the access control, thereby improving the reliability and flexibility of the access control. The REDCAP terminal may independently perform the access control, so as to improve the utilization efficiency of bandwidth resources and avoid the impact of the access of the REDCAP terminal on the communication quality of deployed terminals. In addition, the cell reselection is implemented according to the support capability information of the neighbor cell for the REDCAP terminal so that the second network node pages the REDCAP terminal, thereby further improving the reliability of the access of the REDCAP terminal.

In the embodiments of the present application, an access control method is further provided and may be applied to a second network node, where the second network node is, for example, a base station. It is to be noted that, in this embodiment, the operation performed by the second network node correspond to the operation performed by the first network node in the preceding embodiment, and for technical details not described in detail in this embodiment, reference may be made to any of the preceding embodiments.

Figure 2:
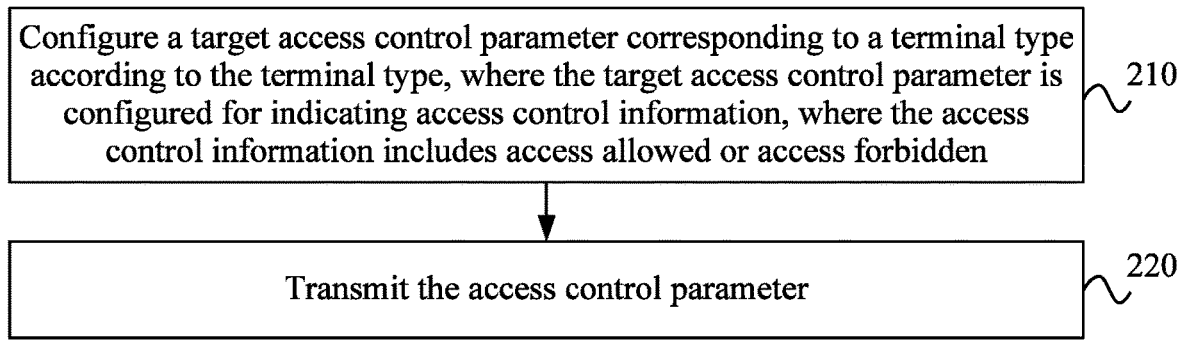
FIG. 2 is a flowchart of an access control method according to another embodiment.

FIG. 2 is a flowchart of an access control method according to another embodiment. As shown in FIG. 2, the method provided in this embodiment includes 210 and 220.

In 210, a target access control parameter corresponding to a terminal type is configured according to the terminal type, where the target access control parameter is configured for indicating access control information, where the access control information includes access allowed or access forbidden.

In 220, the target access control parameter is transmitted.

In this embodiment, the second network node configures corresponding target access control parameters for different terminal types and transmits the target access control parameters to the first network node as a basis for access control of the first network node, so as to achieve the access control for different terminal types, thereby improving the flexibility and reliability of the access control.

In an embodiment, the terminal type is configured according to at least one of terminal type information or terminal capability information.

In an embodiment, the terminal type includes a REDCAP terminal type and a non-REDCAP terminal type.

In an embodiment, an access control category associated with the target access control parameter includes a reserved category in an NR access control category.

In an embodiment, an access control category associated with the target access control parameter includes an occupied category in an NR access control category.

In an embodiment, the method further includes the following.

In 201, n-bit indication information corresponding to the occupied category is configured, where the indication information is configured for indicating access control information corresponding to the occupied category corresponding to the target access control parameter, where n is 1 or 2 or 3 or 4.

In this embodiment, the second network node uses Categories 0 to 8 of the NR for configuring the target access control parameter of the REDCAP terminal, and n-bit indication information is added to Categories 0 to 8, respectively, so as to indicate whether the REDCAP terminal of this type has a barred state consistent with the Category of the NR. The n-bit indication information is only applicable to the REDCAP terminal, but does not work for other terminals in the NR. The n-bit indication information may be used for indicating that the access control information corresponding to each terminal type is access allowed or access forbidden or indicating whether each terminal type has a barred state consistent with the Category of the NR.

In an embodiment, an access control category associated with the target access control parameter includes a predefined REDCAP terminal-specific access control category.

In an embodiment, the specific access control category is defined as one of the following.

A number of specific access control categories is 64, and the specific access control categories include an access control category of a REDCAP terminal, a reserved category for access control of the REDCAP terminal, and an operator-defined category for the access control of the REDCAP terminal.

The number of the specific access control categories is 32, and the specific access control categories include the access control category of the REDCAP terminal and the reserved category for the access control of the REDCAP terminal.

The number of the specific access control categories is 16, and the specific access control categories include the access control category of the REDCAP terminal and the reserved category for the access control of the REDCAP terminal.

The number of the specific access control categories is 9, and the specific access control categories include the access control category of the REDCAP terminal.

In an embodiment, the terminal type includes at least a first REDCAP terminal type and a second REDCAP terminal type, where an access control parameter corresponding to the first REDCAP terminal type is the same as an access control parameter adopted by an NR terminal, and the second REDCAP terminal type corresponds to the target access control parameter.

In this embodiment, the first network node includes at least a first REDCAP terminal and a second REDCAP terminal, where the first REDCAP terminal follows the NR Access Category and the access control of the first REDCAP terminal is performed according to the access control parameter and related configuration of the NR; the second network node needs to configure the target access control parameter for the second REDCAP terminal, the target access control parameter is associated with a newly introduced access control category, and the access control of the second REDCAP terminal is performed according to the newly introduced access control category, where the newly introduced access control category may be the reserved category, the occupied category or the specific access control category in the NR access control category. In this case, the second network node needs to configure the target access control parameter and the like for each newly introduced access control category of the REDCAP terminal.

In an embodiment, the terminal type includes at least a first REDCAP terminal type and a second REDCAP terminal type, where an access control category associated with a target access control parameter corresponding to the first REDCAP terminal type and an access control category associated with a target access control parameter corresponding to the second REDCAP terminal type satisfy one of the following.

The access control category associated with the target access control parameter corresponding to the first REDCAP terminal type and the access control category associated with the target access control parameter corresponding to the second REDCAP terminal type are both reserved categories in an NR access control category.

The access control category associated with the target access control parameter corresponding to the first REDCAP terminal type and the access control category associated with the target access control parameter corresponding to the second REDCAP terminal type are both occupied categories in the NR access control category.

The access control category associated with the target access control parameter corresponding to the first REDCAP terminal type and the access control category associated with the target access control parameter corresponding to the second REDCAP terminal type are both predefined RED-CAP terminal-specific access control categories.

In this embodiment, the first network node includes at least the first REDCAP terminal and the second REDCAP terminal, the second network node configures corresponding target access control parameters for both the first REDCAP terminal and the second REDCAP terminal, the target access control parameters are associated with newly introduced access control categories (both are the reserved categories in the NR access control category, both are the occupied categories, or both are the specific access control categories), and the access control is performed according to the newly introduced access control categories.

In an embodiment, 220 further includes the following.

In the case where the target access control parameter corresponding to the terminal type is not configured, the access control information is determined according to an NR access control parameter.

In this embodiment, in the case where the second network node does not configure the corresponding target access control parameter for the terminal type to which the first network node belongs, the access control information may be determined according to an existing NR access control parameter, and the access control of the first network node is performed according to the access control information, so as to ensure the normal operation of the service of the first network node.

In an embodiment, the method further includes at least one of the following.

In 230, a dedicated neighbor cell list is configured for a REDCAP terminal.

In 240, support capability information of each neighbor cell for the REDCAP terminal is configured in neighbor cell list information.

In this embodiment, the second network node may configure the dedicated neighbor cell list for the REDCAP terminal; or the second network node configures the support capability information of each neighbor cell for the RED-CAP terminal in the neighbor cell list information as a basis for the first network node to determine a candidate neighbor cell or a neighbor cell to be measured. In this case, the second network node may broadcast indication information indicating whether each neighbor cell supports the REDCAP terminal in the neighbor cell list information.

In an embodiment, the support capability information of each neighbor cell for the REDCAP terminal is configured through first indication information in intra-frequency neighbor cell information of a third system information block (SIB3) or through second indication information in inter-frequency neighbor cell information of a fourth system information block (SIB4) or through indication information of intra-frequency neighbor cell information or inter-frequency neighbor cell information in a system information block (SIB) dedicated to the REDCAP terminal.

In an embodiment, the method further includes the following.

In 250, a paging message configuration message corresponding to the terminal type is configured according to the terminal type.

The paging message configuration message includes part of paging related parameters shared with an NR terminal and part of paging related parameters dedicated to a REDCAP terminal.

In this embodiment, the second network node receives a paging message sent by a core network. If the paging message includes support capability information for the REDCAP terminal and the support capability information indicates that the second network node supports the access of the REDCAP terminal, the second network node may page the REDCAP terminal in a configured paging area. The second network node further configures a dedicated paging area or a shared paging area for the REDCAP terminal, and the paging message sent by the core network to the second network node includes the support capability information for the REDCAP terminal, that is, a REDCAP Capability cell is added to the message.

In an embodiment, part of the paging related parameters shared with the NR terminal includes at least one of the following: a default paging cycle or a number (ns) of paging occasions in a paging radio frame.

The dedicated part of the paging related parameters includes at least one of the following: a band width part (BWP) or a physical downlink control channel (PDCCH) paging search space.

In an embodiment, for the above-mentioned part of the paging related parameters shared with the NR terminal and the dedicated part of the paging related parameters, the configuration methods consistent with those in the NR system may be adopted; or the dedicated part of the paging related parameters (the BWP and the PDCCH paging search space) may be configured independently; or part of the paging related parameters shared with the NR terminal, the BWP, and the PDCCH paging search space are all configured independently.

Figure 3:
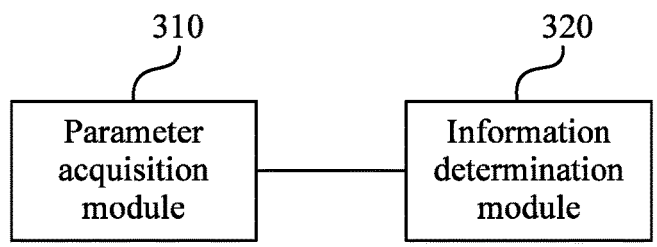
FIG. 3 is a structural diagram of an access control apparatus according to an embodiment.

An embodiment of the present application further provides an access control apparatus. FIG. 3 is a structural diagram of an access control apparatus according to an embodiment. As shown in FIG. 3, the access control apparatus includes a parameter acquisition module 310 and an information determination module 320.

A parameter acquisition module 310 is configured to acquire a target access control parameter according to a terminal type to which the first network node belongs.

An information determination module 320 is configured to determine access control information according to the target access control parameter, where the access control information includes access allowed or access forbidden.

The access control apparatus of this embodiment determines the target access control parameter according to the terminal type to which the first network node belongs and determines whether access is allowed according to the target access control parameter, so as to achieve access control for different types of terminals, respectively, thereby improving the flexibility and reliability of the access control.

In an embodiment, the access control apparatus further includes a type determination module.

The type determination module is configured to determine the terminal type to which the first network node belongs according to at least one of terminal type information or terminal capability information.

In an embodiment, the terminal type includes a REDCAP terminal type and a non-REDCAP terminal type.

In an embodiment, an access control category associated with the target access control parameter includes a reserved category in an NR access control category.

In an embodiment, an access control category associated with the target access control parameter includes an occupied category in an NR access control category.

In an embodiment, an information acquisition module 310 is further configured to acquire n-bit indication information corresponding to the occupied category, where the indication information is configured for indicating access control information corresponding to the occupied category associated with the target access control parameter, where n is 1 or 2 or 3 or 4.

In an embodiment, an access control category associated with the target access control parameter includes a predefined REDCAP terminal-specific access control category.

In an embodiment, the specific access control category is defined as one of the following.

A number of specific access control categories is 64, and the specific access control categories include an access control category of a REDCAP terminal, a reserved category for access control of the REDCAP terminal, and an operator-defined category for the access control of the REDCAP terminal.

The number of the specific access control categories is 32, and the specific access control categories include the access control category of the REDCAP terminal and the reserved category for the access control of the REDCAP terminal.

The number of the specific access control categories is 16, and the specific access control categories include the access control category of the REDCAP terminal and the reserved category for the access control of the REDCAP terminal.

The number of the specific access control categories is 9, and the specific access control categories include the access control category of the REDCAP terminal.

In an embodiment, the terminal type includes at least a first REDCAP terminal type and a second REDCAP terminal type.

An access control parameter corresponding to the first REDCAP terminal type is the same as an access control parameter adopted by an NR terminal, and the second REDCAP terminal type corresponds to the target access control parameter.

In an embodiment, the terminal type includes at least a first REDCAP terminal type and a second REDCAP terminal type.

An access control category associated with a target access control parameter corresponding to the first REDCAP terminal type and an access control category associated with a target access control parameter corresponding to the second REDCAP terminal type satisfy one of the following.

The access control category associated with the target access control parameter corresponding to the first REDCAP terminal type and the access control category associated with the target access control parameter corresponding to the second REDCAP terminal type are both reserved categories in an NR access control category.

The access control category associated with the target access control parameter corresponding to the first REDCAP terminal type and the access control category associated with the target access control parameter corresponding to the second REDCAP terminal type are both occupied categories in the NR access control category.

The access control category associated with the target access control parameter corresponding to the first REDCAP terminal type and the access control category associated with the target access control parameter corresponding to the second REDCAP terminal type are both predefined REDCAP terminal-specific access control categories.

In an embodiment, the information determination module 320 is further configured to perform the following.

In the case where the target access control parameter is not acquired, the access control information is determined according to an NR access control parameter.

In an embodiment, the access control apparatus further includes a neighbor cell determination module and a reselection module.

The neighbor cell determination module is configured to determine a candidate neighbor cell or a neighbor cell to be measured according to a neighbor cell list dedicated to a REDCAP terminal or according to support capability information of each neighbor cell for the REDCAP terminal in neighbor cell list information.

The reselection module is configured to reselect a target cell in the candidate neighbor cell or the neighbor cell to be measured.

In an embodiment, the support capability information of each neighbor cell for the REDCAP terminal is determined according to first indication information in intra-frequency neighbor cell information of a third system information block (SIB3) or according to second indication information in inter-frequency neighbor cell information of a fourth system information block (SIB4) or according to intra-frequency neighbor cell information or inter-frequency neighbor cell information in a system information block (SIB) dedicated to the REDCAP terminal.

In an embodiment, the access control apparatus further includes a message receiving module.

The message receiving module is configured to receive a paging message configuration message corresponding to the terminal type to which the first network node belongs according to the terminal type to which the first network node belongs.

The paging message configuration message includes part of paging related parameters shared with an NR terminal and part of paging related parameters dedicated to a REDCAP terminal.

In an embodiment, part of the paging related parameters shared with the NR terminal includes at least one of the following: a default paging cycle or a number of paging occasions in a paging radio frame.

The dedicated part of the paging related parameters includes at least one of the following: a band width part (BWP) or a physical downlink control channel (PDCCH) paging search space.

The access control apparatus provided in this embodiment and the access control method that is applied to the first network node and provided in the preceding embodiments belong to the same inventive concept. For technical details not described in detail in this embodiment, reference may be made to any one of the preceding embodiments.

Figure 4:
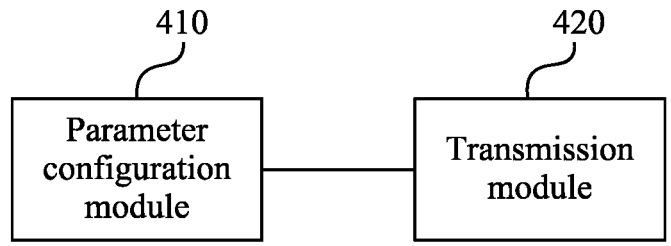
FIG. 4 is a structural diagram of an access control apparatus according to another embodiment.

An embodiment of the present application further provides an access control apparatus. FIG. 4 is a structural diagram of an access control apparatus according to another embodiment. As shown in FIG. 4, the access control apparatus includes a parameter configuration module 410 and a transmission module 420.

A parameter configuration module 410 is configured to configure a target access control parameter corresponding to a terminal type according to the terminal type, where the target access control parameter is configured for indicating access control information, where the access control information includes access allowed or access forbidden.

A transmission module 420 is configured to transmit the access control parameter.

The access control apparatus in this embodiment configures corresponding target access control parameters for different terminal types and transmits the target access control parameters to the first network node as a basis for access control of the first network node, so as to achieve access control for different types of terminals, respectively, thereby improving the flexibility and reliability of the access control.

In an embodiment, the terminal type is configured according to at least one of terminal type information or terminal capability information.

In an embodiment, the terminal type includes a REDCAP terminal type and a non-REDCAP terminal type.

In an embodiment, an access control category associated with the target access control parameter includes a reserved category in an NR access control category.

In an embodiment, an access control category associated with the target access control parameter includes an occupied category in an NR access control category.

In an embodiment, the parameter configuration module 410 is further configured to acquire n-bit indication information corresponding to the occupied category, where the indication information is configured for indicating access control information corresponding to the occupied category corresponding to the target access control parameter, where n is 1 or 2 or 3 or 4.

In an embodiment, an access control category associated with the target access control parameter includes a predefined REDCAP terminal-specific access control category.

In an embodiment, the specific access control category is defined as one of the following.

A number of specific access control categories is 64, and the specific access control categories include an access control category of a REDCAP terminal, a reserved category for access control of the REDCAP terminal, and an operator-defined category for the access control of the REDCAP terminal.

The number of the specific access control categories is 32, and the specific access control categories include the access control category of the REDCAP terminal and the reserved category for the access control of the REDCAP terminal.

The number of the specific access control categories is 16, and the specific access control categories include the access control category of the REDCAP terminal and the reserved category for the access control of the REDCAP terminal.

The number of the specific access control categories is 9, and the specific access control categories include the access control category of the REDCAP terminal.

In an embodiment, the terminal type includes at least a first REDCAP terminal type and a second REDCAP terminal type.

An access control parameter corresponding to the first REDCAP terminal type is the same as an access control parameter adopted by an NR terminal, and the second REDCAP terminal type corresponds to the target access control parameter.

In an embodiment, the terminal type includes at least a first REDCAP terminal type and a second REDCAP terminal type.

An access control category associated with a target access control parameter corresponding to the first REDCAP terminal type and an access control category associated with a target access control parameter corresponding to the second REDCAP terminal type satisfy one of the following.

The access control category associated with the target access control parameter corresponding to the first REDCAP terminal type and the access control category associated with the target access control parameter corresponding to the second REDCAP terminal type are both reserved categories in an NR access control category.

The access control category associated with the target access control parameter corresponding to the first REDCAP terminal type and the access control category associated with the target access control parameter corresponding to the second REDCAP terminal type are both occupied categories in the NR access control category; or the access control category associated with the target access control parameter corresponding to the first REDCAP terminal type and the access control category associated with the target access control parameter corresponding to the second REDCAP terminal type are both predefined REDCAP terminal-specific access control categories.

In an embodiment, the access control apparatus further includes an access control module.

The access control module is configured to determine the access control information according to the NR access control parameter in the case where the target access control parameter corresponding to the terminal type is not configured.

In an embodiment, the parameter configuration module 410 is configured to perform at least one of the following.

A dedicated neighbor cell list is configured for a REDCAP terminal.

Support capability information of each neighbor cell for the REDCAP terminal is configured in neighbor cell list information.

In an embodiment, the support capability information of each neighbor cell for the REDCAP terminal is configured through first indication information in intra-frequency neighbor cell information of a third system information block (SIB3) or through second indication information in inter-frequency neighbor cell information of a fourth system information block (SIB4) or through indication information of intra-frequency neighbor cell information or inter-frequency neighbor cell information in a system information block (SIB) dedicated to the REDCAP terminal.

In an embodiment, a message configuration module is configured to configure a paging message configuration message corresponding to the terminal type according to the terminal type.

The paging message configuration message includes part of paging related parameters shared with an NR terminal and part of paging related parameters dedicated to a REDCAP terminal.

In an embodiment, part of the paging related parameters shared with the NR terminal includes at least one of the following: a default paging cycle or a number (ns) of paging occasions in a paging radio frame.

The dedicated part of the paging related parameters includes at least one of the following: a band width part (BWP) or a physical downlink control channel (PDCCH) paging search space.

The access control apparatus provided in this embodiment and the access control method that is applied to the second network node and provided in the preceding embodiments belong to the same inventive concept. For technical details not described in detail in this embodiment, reference may be made to any one of the preceding embodiments.

An embodiment of the present application further provides a first network node. An access control method applied to the first network node may be performed by an access control apparatus, and the access control apparatus may be implemented in software and/or hardware and integrated in the first network node. The first network node is, for example, a terminal.

Figure 5:
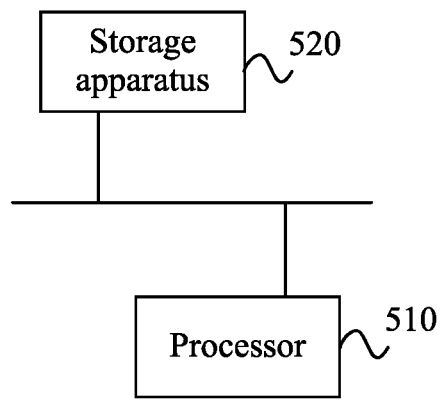
FIG. 5 is a schematic diagram of a hardware structure of a first network node according to an embodiment.

FIG. 5 is a schematic diagram of a hardware structure of a first network node according to an embodiment. As shown in FIG. 5, the first network node provided in this embodiment includes a processor 510 and a storage apparatus 520. The first network node may include one or more processors. One processor 510 is shown as an example in FIG. 5. The processor 510 and the storage apparatus 520 in the device may be connected via a bus or in other manners. The connection via the bus is shown as an example in FIG. 5.

When executed by the one or more processors 510, one or more programs cause the one or more processors to perform the access control method applied to the first network node according to any one of the preceding embodiments.

The storage apparatus 520 in the first network node, as a computer-readable storage medium, may be configured to store one or more programs which may be software programs, computer-executable programs and modules, such as program instructions/modules (for example, modules in the access control apparatus, including the parameter acquisition module 310 and the information determination module 320, as shown in FIG. 3) corresponding to the access control method in the embodiments of the present application. The processor 510 executes software programs, instructions, and modules stored in the storage apparatus 520 to perform various function applications and data processing of the first network node, that is, to perform the access control method in the preceding method embodiments.

The storage apparatus 520 mainly includes a program storage region and a data storage region. The program storage region may store an operating system and an application program required by at least one function. The data storage region may store data (such as the target access control parameter and access control information in the preceding embodiments) created based on use of the device. Additionally, the storage apparatus 520 may include a high-speed random-access memory and may further include a nonvolatile memory, such as at least one magnetic disk memory, a flash memory, or another nonvolatile solid-state memory. In some examples, the storage apparatus 520 may further include memories which are remotely disposed with respect to the processor 510. These remote memories may be connected to the first network node via a network. Examples of the preceding network include, but are not limited to, the Internet, an intranet, a local area network, a mobile communication network and a combination thereof.

In addition, when the one or more programs included in the first network node are executed by the one or more processors 510, the following operations are implemented: acquiring a target access control parameter according to a terminal type to which the first network node belongs; and determining access control information according to the target access control parameter, where the access control information includes access allowed or access forbidden.

The first network node provided in this embodiment and the access control method that is applied to the first network node and provided in the preceding embodiments belong to the same inventive concept. For technical details not described in detail in this embodiment, reference may be made to any one of the preceding embodiments.

A second network node is further provided. An access control method applied to the second network node may be performed by an access control apparatus, and the access control apparatus may be implemented in software and/or hardware and integrated in the second network node. The second network node is a network side device, such as a base station.

Figure 6:
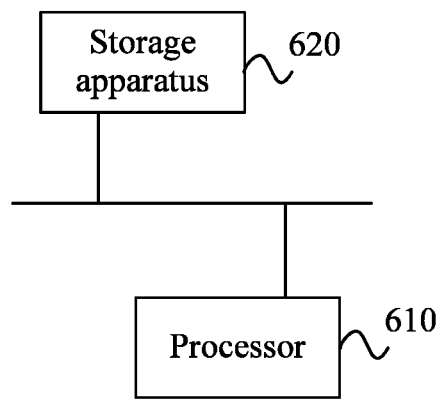
FIG. 6 is a schematic diagram of a hardware structure of a second network node according to an embodiment.

FIG. 6 is a schematic diagram of a hardware structure of a second network node according to an embodiment. As shown in FIG. 6, the second network node provided in this embodiment includes a processor 610 and a storage apparatus 620. The second network node may include one or more processors. One processor 610 is shown as an example in FIG. 6. The processor 610 and the storage apparatus 620 in the device may be connected via a bus or in other manners. The connection via the bus is shown as an example in FIG. 6.

When executed by the one or more processors 610, one or more programs cause the one or more processors to perform the access control method applied to the second network node according to any one of the preceding embodiments.

The storage apparatus 620 in the second network node, as a computer-readable storage medium, may be configured to store one or more programs which may be software programs, computer-executable programs and modules, such as program instructions/modules (for example, modules in the access control apparatus, including the parameter configuration module 410 and the transmission module 420, as shown in FIG. 4) corresponding to the access control method in the embodiments of the present application. The processor 610 executes software programs, instructions, and modules stored in the storage apparatus 620 to perform various function applications and data processing of the second network node, that is, to perform the access control method in the preceding method embodiments.

The storage apparatus 620 mainly includes a program storage region and a data storage region. The program storage region may store an operating system and an application program required by at least one function. The data storage region may store data (such as the target access control parameter and access control information in the preceding embodiments) created based on use of the device. Additionally, the storage apparatus 620 may include a high-speed random-access memory and may further include a nonvolatile memory, such as at least one magnetic disk memory, a flash memory, or another nonvolatile solid-state memory. In some examples, the storage apparatus 620 may further include memories which are remotely disposed with respect to the processor 610. These remote memories may be connected to the second network node via a network. Examples of the preceding network include, but are not limited to, the Internet, an intranet, a local area network, a mobile communication network and a combination thereof.

In addition, when the one or more programs included in the second network node are executed by the one or more processors 610, the following operations are implemented: acquiring a target access control parameter corresponding to a terminal type according to the terminal type, where the target access control parameter is configured for indicating access control information, and the access control information includes access allowed or access forbidden; and transmitting the access control parameter.

The second network node provided in this embodiment and the access control method that is applied to the second network node and provided in the preceding embodiments belong to the same inventive concept. For technical details not described in detail in this embodiment, reference may be made to any one of the preceding embodiments.

An embodiment of the present application further provides a storage medium including computer-executable instructions which, when executed by a computer processor, perform an access control method.

From the preceding description of embodiments, it is apparent to those skilled in the art that the present application may be implemented by means of software and general-purpose hardware or may be implemented by hardware. Based on this understanding, the technical solutions provided by the present application may be embodied in the form of a software product. The computer software product is stored in a computer-readable storage medium, such as a computer floppy disk, a read-only memory (ROM), a random-access memory (RAM), a flash, a hard disk, or an optical disk, and includes several instructions for enabling a computer device (which may be a personal computer, a server, or a network device) to perform the method of any embodiment of the present application.

The above are only exemplary embodiments of the present application and are not intended to limit the protection scope of the present application.

A block diagram of any logic flow among the drawings of the present application may represent program steps, may represent interconnected logic circuits, modules and functions, or may represent a combination of program steps with logic circuits, modules and functions. Computer programs may be stored in the memory. The memory may be of any type suitable for a local technical environment and may be implemented using any suitable data storage technology, such as, but not limited to, a read-only memory (ROM), a random-access memory (RAM) and an optical memory apparatus and system (a digital versatile disc (DVD) or a compact disk (CD)). The computer-readable medium may include a non-transitory storage medium. The data processor may be in any type suitable for the local technical environment, for example, but not limited to, a general-purpose computer, a special-purpose computer, a microprocessor, a digital signal processor (DSP), an application-specific integrated circuit (ASIC), a field-programmable gate array (FGPA), and a processor based on a multi-core processor architecture.

What is claimed is:

1. An access control method, applied to a first network node, comprising:
    acquiring a target access control parameter according to a terminal type to which the first network node belongs; and
    determining access control information according to the target access control parameter, wherein the access control information comprises access allowed or access forbidden;
    wherein the access control method further comprises:
    determining the terminal type to which the first network node belongs according to at least one of terminal type information or terminal capability information;
    wherein the access control method further comprises:
        determining a candidate neighbor cell or a neighbor cell to be measured according to a neighbor cell list dedicated to a reduced capability (REDCAP) terminal or according to support capability information of each neighbor cell for the REDCAP terminal in neighbor cell list information; and
        reselecting a target cell in the candidate neighbor cell or the neighbor cell to be measured.

2. The method of claim 1, wherein the terminal type comprises a REDCAP terminal type and a non-reduced-capability (non-REDCAP) terminal type.

3. The method of claim 1, wherein an access control category associated with the target access control parameter comprises a reserved category in a New Radio (NR) access control category.

4. The method of claim 1, wherein an access control category associated with the target access control parameter comprises an occupied category in an NR access control category;
    wherein the access control method further comprises:
        acquiring n-bit indication information corresponding to the occupied category, wherein the indication information is configured for indicating access control information corresponding to the occupied category associated with the target access control parameter, wherein n is 1 or 2 or 3 or 4.

5. The method of claim 1, wherein an access control category associated with the target access control parameter comprises a predefined REDCAP terminal-specific access control category.

6. The method of claim 1, wherein the terminal type comprises at least a first REDCAP terminal type and a second REDCAP terminal type;
    wherein an access control category associated with a target access control parameter corresponding to the first REDCAP terminal type and an access control category associated with a target access control parameter corresponding to the second REDCAP terminal type satisfy one of the following:
    the access control category associated with the target access control parameter corresponding to the first REDCAP terminal type and the access control category associated with the target access control parameter corresponding to the second REDCAP terminal type being both reserved categories in an NR access control category;
    the access control category associated with the target access control parameter corresponding to the first REDCAP terminal type and the access control category associated with the target access control parameter corresponding to the second REDCAP terminal type being both occupied categories in the NR access control category; or
    the access control category associated with the target access control parameter corresponding to the first REDCAP terminal type and the access control category associated with the target access control parameter corresponding to the second REDCAP terminal type being both predefined REDCAP terminal-specific access control categories.

7. The method of claim 1, further comprising:
    in a case where the target access control parameter is not acquired, determining the access control information according to an NR access control parameter.

8. The method of claim 1, wherein the support capability information of each neighbor cell for the REDCAP terminal is determined according to first indication information in intra-frequency neighbor cell information of a third system information block (SIB3) or according to second indication information in inter-frequency neighbor cell information of a fourth system information block (SIB4) or according to intra-frequency neighbor cell information or inter-frequency neighbor cell information in a system information block (SIB) dedicated to the REDCAP terminal.

9. A non-transitory computer-readable storage medium, which is configured to store computer programs which, when executed by a processor, perform the access control method of claim 1.

10. An access control method applied to a second network node and comprising:
    configuring a target access control parameter corresponding to a terminal type according to the terminal type, wherein the target access control parameter is configured for indicating access control information, and the access control information comprises access allowed or access forbidden; and
    transmitting the target access control parameter;
    wherein the terminal type is configured according to at least one of terminal type information or terminal capability information;

wherein the access control method further comprises at least one of the following:
  configuring a dedicated neighbor cell list for a reduced capability (REDCAP) terminal; and
  configuring support capability information of each neighbor cell for the REDCAP terminal in neighbor cell list information.

11. The method of claim 10, wherein the terminal type comprises a REDCAP terminal type and a non-reduced-capability (non-REDCAP) terminal type.

12. The method of claim 10, wherein an access control category associated with the target access control parameter comprises a reserved category in a New Radio (NR) access control category.

13. The method of claim 10, wherein an access control category associated with the target access control parameter comprises an occupied category in an NR access control category;
wherein the access control method further comprises:
  configuring n-bit indication information corresponding to the occupied category, wherein the indication information is configured for indicating access control information corresponding to the occupied category corresponding to the target access control parameter, wherein n is 1 or 2 or 3 or 4.

14. The method of claim 10, wherein an access control category associated with the target access control parameter comprises a predefined REDCAP terminal-specific access control category.

15. The method of claim 10, wherein the terminal type comprises at least a first REDCAP terminal type and a second REDCAP terminal type;
wherein an access control category associated with a target access control parameter corresponding to the first REDCAP terminal type and an access control category associated with a target access control parameter corresponding to the second REDCAP terminal type satisfy one of the following:

the access control category associated with the target access control parameter corresponding to the first REDCAP terminal type and the access control category associated with the target access control parameter corresponding to the second REDCAP terminal type being both reserved categories in an NR access control category;

the access control category associated with the target access control parameter corresponding to the first REDCAP terminal type and the access control category associated with the target access control parameter corresponding to the second REDCAP terminal type being both occupied categories in the NR access control category; or the access control category associated with the target access control parameter corresponding to the first REDCAP terminal type and the access control category associated with the target access control parameter corresponding to the second REDCAP terminal type being both predefined REDCAP terminal-specific access control categories.

16. The method of claim 10, further comprising:
in a case where the target access control parameter corresponding to the terminal type is not configured, determining the access control information according to an NR access control parameter.

17. The method of claim 10, wherein the support capability information of each neighbor cell for the REDCAP terminal is configured through first indication information in intra-frequency neighbor cell information of a third system information block (SIB3) or through second indication information in inter-frequency neighbor cell information of a fourth system information block (SIB4) or through indication information of intra-frequency neighbor cell information or inter-frequency neighbor cell information in a system information block (SIB) dedicated to the REDCAP terminal.

* * * * *